UNITED STATES PATENT OFFICE 2,471,082

CALCIUM CADMIUM SILICATE PHOSPHOR

James H. Schulman, Cambridge, Mass., assignor to Sylvania Electric Products Inc., Salem, Mass., a corporation of Massachusetts No Drawing. Application March 28, 1946, Serial No. 657,919

3 Claims. (Cl. 252—301.6)

This invention relates to luminescent materials and more particularly to an activated calcium silicate phosphor used in the preparation of a coating of fluorescent material for an electric gaseous discharge device, such as a fluorescent lamp.

An object of this invention is to provide an activated calcium silicate phosphor which will be somewhat redder than that obtainable by presently employed methods of synthesizing activated calcium silicate.

Another object of this invention is to provide an activated calcium silicate phosphor of fine particle size.

A further object of this invention is to provide an activated calcium silicate phosphor which, when employed as a coating for fluorescent lamps and the like, will give the lamp a high lumens per watt output.

Further objects, advantages and features will be apparent from the following specification.

My invention embodies the idea of replacing some of the calcium in an activated calcium silicate phosphor with cadmium. I have found that when calcium is replaced by cadmium, substantially of the order of about 10 mole percent, a redder phosphor of fine particle size than that obtainable with the conventional activated calcium silicate is obtained. When this phosphor is used in a fluorescent lamp the lumens per watt output of the lamp is increased substantially over the lumens per watt output of a lamp coated with the conventional activated calcium silicate phosphor. When substantially more than 10 mole percent of cadmium is used the above-mentioned desirable characteristics are not obtained.

For example, in preparing a manganese-activated calcium-cadmium lead silicate phosphor I wet-mill calcium carbonate, cadmium carbonate, manganous carbonate, silicic acid and lead fluoride in the following proportions:

| | Moles |
|---|---|
| $CaCO_3$ | 1 —0.7 |
| $CdCO_3$ | 0 —0.3 |
| $MnCO_3$ | .044— .088 |
| $PbF_2$ | .0078 |
| $SiO_2$ | 1.20 |

The blend is filtered, dried and pulverized. It is then tray fired at about 2100° F. for about six hours. If desired, the fired material may be repulverized and refired for about six more hours at about 2100° F.

The following test data illustrate the result obtained with 0.066 mole of Mn when the phosphor raw materials were fired once for about six hours at about 2100° F. The resultant phosphor was used in the preparation of a luminescent material suspension and the suspension was applied to an elongated glass tube about 1½ inches in diameter, which was in turn manufactured into a 40-watt lamp. The lamps in each case were coated with sufficient powder to give optimum light output.

Table I

| Example | Moles | | Ratio Cd/Ca | Powder Weight 40-watt lamp | Lumens per watt | |
|---|---|---|---|---|---|---|
| | Ca | Cd | | | 0 hrs. | 100 hrs. |
| | | | | G. | | |
| 1 | 1.0 | 0 | 0 | 3.30 | 44.4 | 42.6 |
| 2 | 0.9 | 0.1 | 0.11 | 2.65 | 45.2 | 42.6 |
| 3 | 0.8 | 0.2 | 0.25 | 2.77 | 40.2 | 38.6 |

The following test data were obtained in the case of double-fired material:

Table II

| Example | Moles | | Ratio Cd/Ca | Powder Weight 40-watt lamp | Lumens per watt | | |
|---|---|---|---|---|---|---|---|
| | Ca | Cd | | | 0 hrs. | 100 hrs. | 300 hrs. |
| | | | | G. | | | |
| 1 | 1.0 | 0 | 0 | 3.67 | 44.2 | 41.8 | 40.6 |
| 2 | 0.9 | 0.1 | 0.11 | 3.27 | 48.4 | 46.8 | 45.0 |
| 3 | 0.8 | 0.2 | 0.25 | 3.45 | 43.4 | 41.2 | 39.6 |

In the examples of the single fired material in Table I it may be observed that when about 10 mole percent of cadmium is used the powder weight for a 40-watt lamp is appreciably less and the initial lumens per watt output is higher than when no cadmium is used. In Example 3, it may be observed that when considerably more than 10 mole percent of cadmium is used the powder weight increases slightly and the lumens per watt decreases sharply.

In the examples of the double-fired material in Table II it may be observed that when about 10 mole percent of cadmium is used the powder weight is appreciably less than when no cadmium is used. The lumens per watt output of the lamp is considerably higher initially and at the end of 100 and 300 hours than when no cadmium is used. In Example 3 it may be noted that when considerably more than 10 mole percent of cadmium is used the powder weight increases and the lumens per watt decreases.

What I claim is:

1. A luminescent material consisting essentially of calcium cadmium silicate, activated by manganese and lead, in which the cadmium is about 10 mol percent of the calcium cadmium compound.

2. A luminescent material consisting essentially of calcium cadmium silicate, activated by manganese and lead, in which the cadmium is about 10 mol percent of the calcium cadmium compound, the manganese is between about .044 and about .088 mol per mol of calcium plus cadmium, and the lead is about .0078 mol per mol of calcium plus cadmium.

3. A luminescent material consisting essentially of calcium cadmium silicate, activated by manganese and lead, in which the cadmium is about 10 mol percent of the calcium cadmium compound, the manganese is about .066 mol per mol of calcium plus cadmium, and the lead is about .0078 mol per mol of calcium plus cadmium.

JAMES H. SCHULMAN.

REFERENCES CITED

The following references are of record in the file of this patent:

UNITED STATES PATENTS

| Number | Name | Date |
| --- | --- | --- |
| 2,143,077 | Leverenz | Jan. 10, 1939 |
| 2,171,145 | Leverenz | Aug. 29, 1939 |
| 2,299,510 | Steadman | Oct. 20, 1942 |

FOREIGN PATENTS

| Number | Country | Date |
| --- | --- | --- |
| 469,776 | Great Britain | Aug. 3, 1937 |